United States Patent
He et al.

(10) Patent No.: US 10,402,988 B2
(45) Date of Patent: *Sep. 3, 2019

(54) IMAGE PROCESSING APPARATUSES AND METHODS

(71) Applicant: Guangdong Virtual Reality Technology Co., Ltd., Shenzhen (CN)

(72) Inventors: Jie He, Shenzhen (CN); Jingwen Dai, Shenzhen (CN); Congling Wan, Shenzhen (CN); Yongtao Hu, Shenzhen (CN)

(73) Assignee: GUANGDONG VIRTUAL REALITY TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,838

(22) Filed: Dec. 12, 2017

(65) Prior Publication Data

US 2019/0180452 A1 Jun. 13, 2019

Related U.S. Application Data

(63) Continuation-in-part of application No. 15/578,705, filed on Nov. 30, 2017.

(51) Int. Cl.
| | |
|---|---|
| *G06T 7/246* | (2017.01) |
| *G06T 7/73* | (2017.01) |
| *G06T 5/00* | (2006.01) |
| *G06T 7/60* | (2017.01) |
| *G06K 9/62* | (2006.01) |
| *G06T 5/20* | (2006.01) |

(52) U.S. Cl.
CPC ............ *G06T 7/248* (2017.01); *G06K 9/6218* (2013.01); *G06T 5/002* (2013.01); *G06T 5/20* (2013.01); *G06T 7/60* (2013.01); *G06T 7/74* (2017.01); *G06T 2207/30241* (2013.01)

(58) Field of Classification Search
CPC ................................ G06T 7/248; G06T 7/74; G06T 5/002; G06T 5/20; G06T 7/60; G06K 9/6218
See application file for complete search history.

(56) References Cited

U.S. PATENT DOCUMENTS

| | | | | |
|---|---|---|---|---|
| 4,979,815 A | * | 12/1990 | Tsikos | G01B 11/2522 356/2 |
| 2009/0128685 A1 | * | 5/2009 | Wagner | G01B 11/24 348/367 |
| 2011/0228116 A1 | * | 9/2011 | Margalith | G01J 3/2803 348/222.1 |
| 2013/0026945 A1 | * | 1/2013 | Ganick | G01S 1/70 315/246 |

(Continued)

*Primary Examiner* — Dramos Kalapodas
(74) *Attorney, Agent, or Firm* — Cheng-Ju Chiang

(57) ABSTRACT

Embodiments of the disclosure provide an image processing apparatus and an image processing method for positioning and identifying signals sources. The image processing apparatus includes an imaging device to capture an image containing a set of pixels, wherein the set of pixels comprises a first subset of pixels representing a plurality of stripes associated with the multiple signal sources; a memory to store the image; a positioning device to determine positions of the multiple signal sources according to the stripes; and an identity determining device to determine identities of the multiple signal sources.

11 Claims, 13 Drawing Sheets

(56) References Cited

U.S. PATENT DOCUMENTS

| | | | |
|---|---|---|---|
| 2014/0028861 A1* | 1/2014 | Holz | H04N 5/23277 |
| | | | 348/208.4 |
| 2014/0086590 A1* | 3/2014 | Ganick | G06Q 30/02 |
| | | | 398/118 |
| 2016/0227153 A1* | 8/2016 | Ryan | H04N 5/455 |
| 2018/0018789 A1* | 1/2018 | Lenor | G06T 7/11 |
| 2018/0255280 A1* | 9/2018 | Gutierrez | H04N 9/646 |
| 2019/0012795 A1* | 1/2019 | Dai | G06T 7/292 |

* cited by examiner

IMAGE PROCESSING APPARATUSES AND METHODS

CROSS-REFERENCE TO RELATED APPLICATION

This application is a continuation-in-part application of U.S. application Ser. No. 15/578,705, filed on Nov. 30, 2017, which is a 35 U.S.C. § 371 National Phase conversion of International (PCT) application No. PCT/CN2016/076980, titled "METHOD, DEVICE AND TERMINAL FOR DETERMINING EFFECTIVENESS OF STRIPE SET" and filed on Mar. 22, 2016. The entirety of the above-mentioned application is hereby incorporated by reference herein.

FIELD OF THE INVENTION

The present disclosure relates to an image processing apparatus and an image processing method, and more particularly, to apparatuses, systems, methods for positioning and identifying signal sources.

BACKGROUND OF THE INVENTION

Signal source tracking technologies are critical for a motion sensing game system, a human-machine interaction system, and the like. For example, the motion sensing game system may include an image capturing device and an image processing device. The image capturing device may be configured for capturing external images containing a signal source (e.g., a visible light source or an infrared light source), and the image processing device is configured for processing the external images so as to locate spatial a position of the signal source, and determine a movement trajectory of the signal source. Generally, interference must be minimized to ensure successfully determining the movement trajectory of the signal source. For example, background light source should be avoided. Otherwise, the interference from the background light source may deteriorate the performance of the image capturing device and the image processing device. For example, FIG. 1 illustrates an exemplary image with two signal sources 101 and 103, and a lamp 105 being captured, and two signal sources 101 and 103 may not be identified and positioned correctly because of the interference from lamp 105.

Therefore, applications of apparatuses such as a motion sensing game apparatus are highly limited. Embodiments of the disclosure address the above problems.

SUMMARY OF THE INVENTION

Embodiments of the disclosure provide an image processing apparatus for positioning and identifying multiple signal sources. The image processing apparatus includes an imaging device, a memory, a positioning device and an identity determining device. The imaging device is configured to capture an image containing a set of pixels. The set of pixels includes a first subset of pixels representing a plurality of stripes associated with the multiple signal sources. The memory is configured to store the image. The positioning device is configured to determine positions of the multiple signal sources according to the stripes. The identity determining device is configured to determine identities of the multiple signal sources.

Embodiments of the disclosure further provide an image processing system for positioning and identifying signal sources in a space. The image processing system includes two image processing apparatuses separated by a distance, and a processor. The two image processing apparatuses are configured to respectively generate process results for the signal sources. The processor is connected with the two image processing apparatuses, to receive the process results from the two image processing apparatuses and determine positions of the signal sources in the space based on the process results and the distance. Each of the two image processing apparatuses includes an imaging device, a memory, a positioning device and an identity determining device. The imaging device is configured to capture an image containing a set of pixels. The set of pixels includes a first subset of pixels representing a plurality of stripes associated with the multiple signal sources. The memory to store the image. The positioning device to determine positions of the multiple signal sources according to the stripes. The identity determining device to determine identities of the multiple signal sources.

Embodiments of the disclosure further provide a method for positioning and identifying signal sources, including: receiving, via an image processing apparatus, an image containing a set of pixels, wherein the set of pixels comprises a first subset of pixels representing a plurality of stripes associated with the multiple signal sources; storing, via the image processing apparatus, the image and feature information regarding the signal sources; binarizing, via the image processing apparatus, pixel values for pixels of the image into a first pixel value or a second pixel value, wherein the first pixel value corresponds to the first and second subset of the pixels and the second pixel value correspond to background pixels; connecting, via the image processing apparatus, neighboring pixels having the first pixel value to form a plurality of connected domains associated with the plurality of stripes; grouping, via the image processing apparatus, the plurality of connected domains into domain groups corresponding to the signal sources; determining, via the image processing apparatus, locations of the domain groups corresponding to the signal sources; and determining, via the image processing apparatus, identities of the multiple signal sources.

Embodiments of the disclosure further provide a non-transitory computer readable medium that stores a set of instructions that are executable by at least one processor of an image processing apparatus to cause the apparatus to perform a method for positioning and identifying signal sources. The method includes: receiving an image containing a set of pixels, wherein the set of pixels comprises a first subset of pixels representing a plurality of stripes associated with the multiple signal sources; storing the image and feature information regarding the signal sources; binarizing pixel values for pixels of the image into a first pixel value or a second pixel value, wherein the first pixel value corresponds to the first and second subset of the pixels and the second pixel value correspond to background pixels; connecting neighboring pixels having the first pixel value to form a plurality of connected domains associated with the plurality of stripes; grouping the plurality of connected domains into domain groups corresponding to the signal sources; determining locations of the domain groups corresponding to the signal sources; and determining identities of the multiple signal sources.

It is to be understood that both the foregoing general description and the following detailed description are exemplary and explanatory only and are not restrictive of the invention, as claimed.

BRIEF DESCRIPTION OF THE DRAWINGS

Methods, systems, and/or programming described herein are further described in terms of exemplary embodiments.

These exemplary embodiments are described in detail with reference to the drawings. These embodiments are non-limiting exemplary embodiments, in which like reference numerals represent similar structures throughout the several views of the drawings.

DETAILED DESCRIPTION OF PREFERRED EMBODIMENTS

Embodiments of the disclosure provide an image processing apparatus and an image processing method to determine spatial positions of signal sources and to identify the signal sources even when an interference signal source exists along with the signal sources. Therefore, it is possible to track the signal sources with a higher accuracy.

Figure 1:
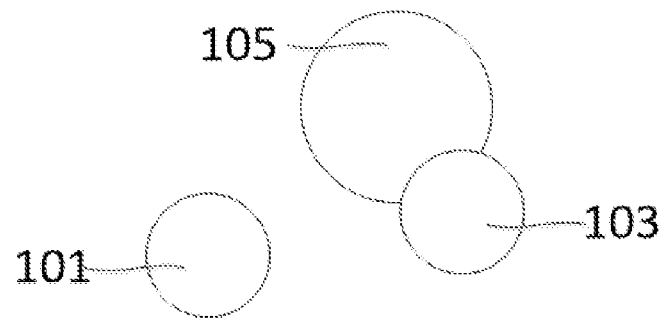
FIG. 1 illustrates an exemplary image with two signal sources and a lamp being captured.
Figure 2:
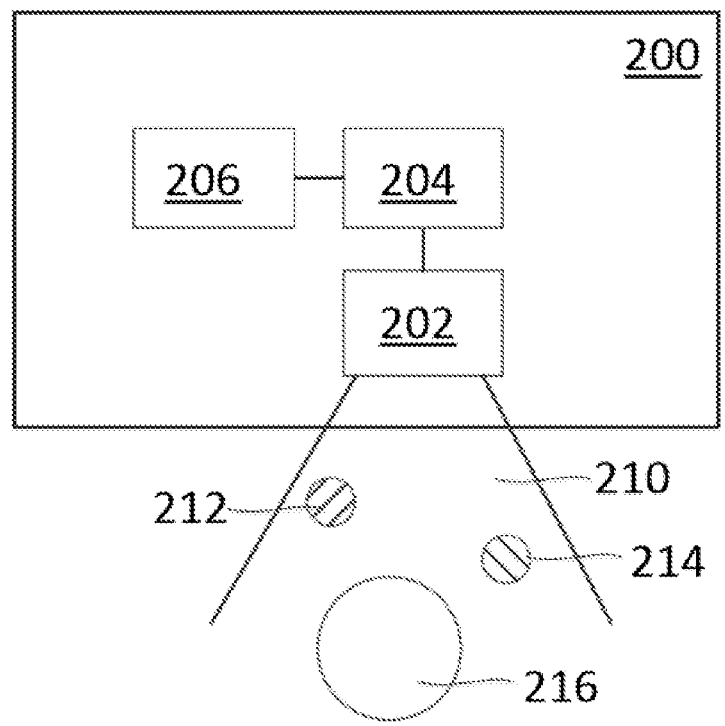
FIG. 2 illustrates a schematic diagram of an image processing apparatus, according to embodiments of the disclosure.

FIG. 2 illustrates a schematic diagram of an image processing apparatus 200 according to embodiments of the disclosure. Image processing apparatus 200 may include an imaging device 202, a memory device 204, and a positioning device 206.

Imaging device 202 may be any device capable of capturing images of the object(s) within its field of view 210. Imaging device 202 may include an image sensor (not shown) with a rolling shutter. The image sensor may be a Complementary Metal Oxide Semiconductor (CMOS) sensor, a Charge-Coupled Device (CCD) sensor, or any type of image sensor capable of capturing incident photons and reading pixel data.

In some embodiments, the image sensor scans and reads the pixel data in a row-by-row fashion. And a signal source to be captured may produce light pulses at a pulse frequency. When the pulse frequency of the signal source is higher than a scanning frequency of the image sensor, an artifact (or image distortion) including a pattern of alternating dark/white stripes may appear in the image. The stripes may have a same width. The width may be directly proportional to the scanning frequency and inversely proportional to the pulse frequency. In addition, the number of the stripes included in the pattern may be directly proportional to the pulse frequency. That is, a signal source having a specific pulse frequency may be identified by stripes corresponding to the pulse frequency that appear in an image.

In some embodiments, stripes may have different widths. Some of the stripes may have a same width, and the others may have different width(s). The light source causing the stripes with various widths may be identified based on characteristic features. That is, the stripes may have a pattern. In some embodiments, the pattern may include a width of the stripes and a width of gaps between the stripes.

As shown in FIG. 2, field of view 210 may cover a first signal source 212, a second signal source 214, and an interference source 216. It should be noted that, any number of interference sources and signal sources may be covered by the field of view. For example, field of view 210 may only cover one signal source and no interference source.

In some embodiments, interference source 216 is an ambient light source that may interfere with first and second signal sources 212 and 214. Interference source 216 may be any other signal source that interferes with first and second signal sources 212 and 214.

First and second signal sources 212 and 214 may be visible light sources or non-visible light sources. For example, in the embodiment of FIG. 2, first and second signal sources 212 and 214 may emit visible light pulses at a pulse frequency to generate stripes in the image. The stripes may have a pattern, including a width of the stripes and a width of gaps between the stripes.

In some embodiments, imaging device 202 may capture an image of first signal source 212, second signal source 214, and a noise source. Because interference source 216 may interfere first and second signal sources 212 and 214, interference source 216 may also be considered as a part of the noise source. Therefore, the image captured by imaging device 202 may contain a set of pixels, which further includes a first subset of pixels representing a plurality of stripes associated with the signal sources and a second subset of pixels associated with the noise source.

Memory device 204 may include any appropriate type of mass storage provided to store any type of information that image processing apparatus 200 needs to operate, such as images captured by imaging device 202. Memory device 204 may be a volatile or non-volatile, magnetic, semiconductor, tape, optical, removable, non-removable, or other type of storage device or tangible and/or, non-transitory computer-readable medium including, but not limited to, a ROM, a flash memory, a dynamic RAM, a cache, a register, and a static RAM. It should be noted that, even images not captured by imaging device 202 (for example, images input by another device) may be also subject to processes discussed below, as long as the images contains the stripes for identifying signal sources.

Memory device 204 may be configured to store one or more computer programs that may be executed by image processing apparatus 200 to perform an exemplary object positioning function, an exemplary object identifying function, or any other function. For example, memory device 204 may be configured to store programs that may be executed by the processor to measure widths of stripes included in an alternating-stripe pattern and determine a center of an object containing the stripes. In another example, memory device 204 may be configured to store a look-up table including identities of signal sources and their corresponding pulse frequencies (or ranges thereof), so that the signal sources causing alternating stripes in an image may be identified by consulting the look-up table if corresponding pulse frequencies have been obtained.

Positioning device 206 may be configured to determine a position of the signal source. In some embodiments, positioning device 206 determines a position of a signal source by determining a center of the stripes. The center may be considered as the position of the signal source. Other methods for determining a position of a signal source may be adopted, and are not limited to the above example. Positioning device 206 is further described below.

Figure 3:
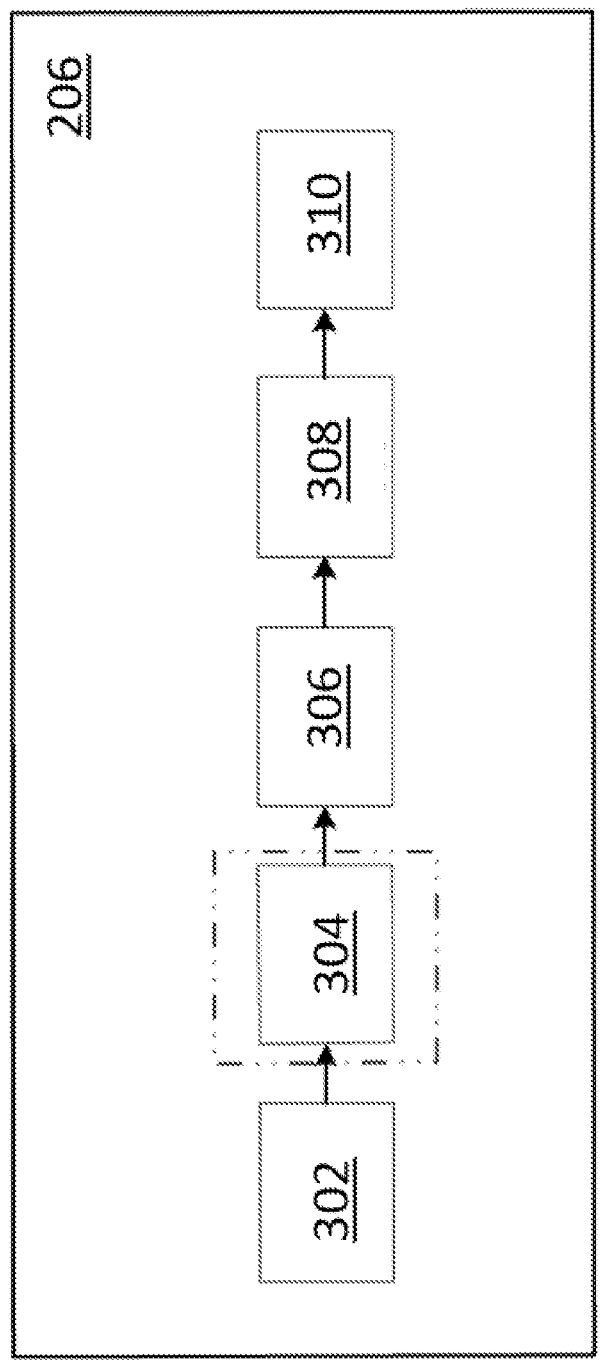
FIG. 3 illustrates a block diagram of a positioning device, according to embodiments of the disclosure.

FIG. 3 further illustrates a block diagram of positioning device 206, according to embodiments of the disclosure.

As shown in FIG. 3, positioning device 206 may include a binarizer 302, a filter 304, a connecting unit 306, a domain analyzer 308, and a center analyzer 310.

Figure 4A:
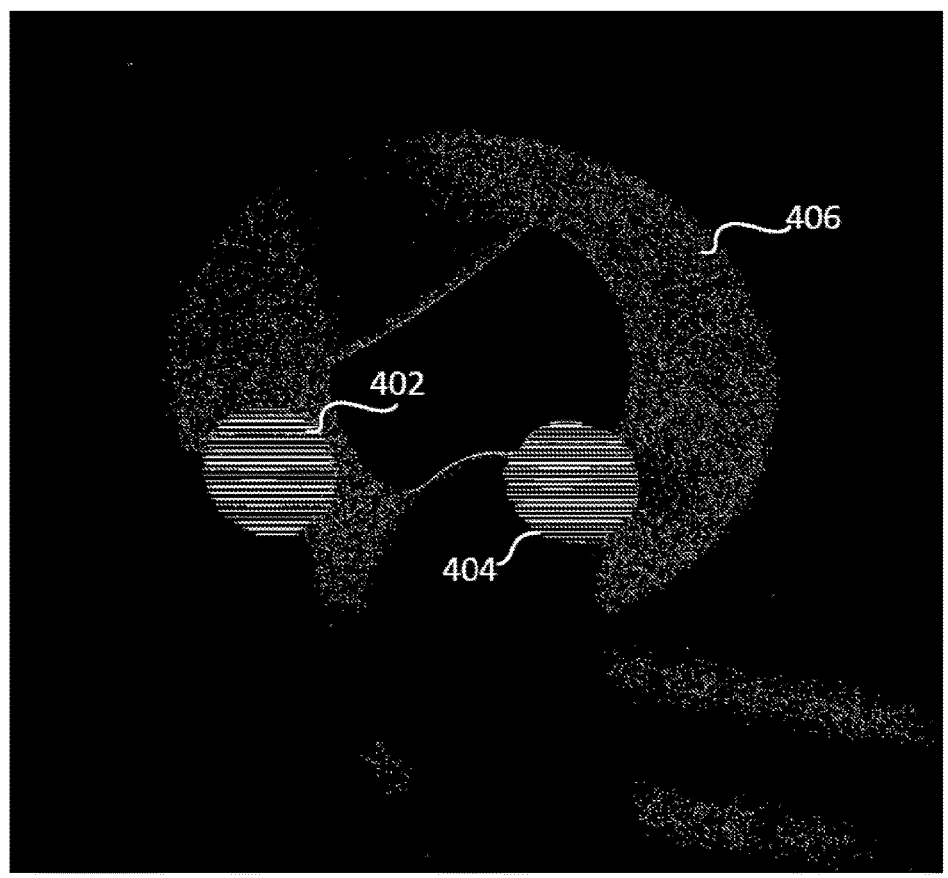
FIGS. 4A-4D illustrate exemplary images generated by components of an image processing apparatus, according to embodiments of the disclosure.

Binarizer 302 can be a packaged functional hardware unit designed for use with other components (e.g., portions of an integrated circuit) or a part of a program (stored on a computer readable medium) that performs a particular function, so as to binarize pixel values for pixels of the image captured by imaging device 202, into a first pixel value $P_a$ or a second pixel value $P_b$. For example, the first pixel value $P_a$ may be set to "1", and the second pixel value $P_b$ may be set to "0". FIG. 4A illustrates an exemplary image generated by binarizer 302.

As shown in FIG. 4A, pixels 402, 404, and 406 corresponding to first and second signal sources 212 and 214 and interference source 216 are assigned with the first pixel value $P_a$ by binarizer 302, and other background pixels are assigned with the second pixel value $P_b$. Therefore, in FIG. 4A, pixels for first and second signal sources 212 and 214 and interference source 216 are displayed in white, and the background pixels are displayed in black. It should be noted, some noises are displayed as white dots.

In some embodiments, binarizer 302 may perform a binarization method to convert the image into a binary image. For example, the binarization method may include any one of a global method, a local method, or an adaptive method, as discussed below.

In the global method, a threshold pixel value $P_{def}$ is pre-defined by a user, and each of the pixel values in an image will be compared with the threshold pixel value $P_{def}$. If a pixel value $P_i$ is greater than or equals to the threshold pixel value $P_{def}$ (i.e., $P_i \geq P_{def}$), the pixel value $P_i$ will be assigned with the first pixel value $P_a$. Otherwise, if the pixel value $P_i$ is less than the threshold pixel value $P_{def}$ (i.e., $P_i < P_{def}$), the pixel value $P_i$ will be assigned with the second pixel value $P_b$. Pixel values of every frame image may be processed according to the same threshold pixel value $P_{def}$. This global method may be applied to an environment with fewer interference sources and smaller area.

In the local method, a threshold pixel value $P_{def}(t)$ for a current frame image t is determined based on the threshold pixel values of m previous frames of the current frame image t. For example, the threshold pixel value $P_{def}(t)$ for the current frame is a minimum value of the m previous frames of the current frame image t. That is, $P_{def}(t)$=Minimum $(P_{def}(t-1), P_{def}(t-2), \ldots, P_{def}(t-m))$. The threshold pixel value $P_{def}(t)$ for the current frame may also be a maximum value of the m previous frames of the current frame image t. After the threshold pixel value $P_{def}(t)$ for the current frame is determined, pixel values of the current frame may be converted into a binary image according to the threshold pixel value $P_{def}(t)$, similarly as in the global method. That is, a pixel value of each pixel in an image will be compared with the threshold pixel value $P_{def}(t)$, so as to generate a binarized image.

The local method has to calculate a threshold pixel value for each of the frame images. Therefore, generated binary images have a better quality than the global method, but requiring more computing resources to implement the method.

In the adaptive method, it may scan the current frame image from top to bottom and from left to right, and each pixel value $P_i$ of the current frame image is compared with a preset value $P_{def}$ (predefined by a user). If the pixel value $P_i$ of a current pixel is less than the preset value $P_{def}$ ($P_i < P_{def}$), the pixel value $P_i$ is assigned with the second value $P_b$. And if the pixel value $P_i$ is greater than or equals to the preset value $P_{def}$ ($P_i \geq P_{def}$), a neighborhood value $P_{cal}$ (e.g. a mean value, a Gaussian distribution value, or the like) in a neighborhood area of M×N pixels of the current pixel is calculated, wherein M and N are integers greater than or equal to 1.

Then, the result $P_{cal}$ is compared with the pixel value $P_i$ of the current pixel. If the result $P_{cal}$ is less than the pixel value $P_i$ of the current pixel (i.e. $P_{cal} < P_i + P_{delta}$, $P_{delta}$ is a judgmental buffer parameter), the pixel value $P_i$ of the current pixel is assigned with the first value $P_a$; otherwise, if the result $P_{cal}$ is greater than or equals to the pixel value $P_i$ of the current pixel (i.e., $P_{cal} \geq P_i + P_{delta}$), the pixel value $P_i$ of the current pixel is assigned with the second value $P_b$. The adaptive method offers the best accuracy by consuming the largest computing resources.

Those skilled in the art may adopt any of the above methods to convert the image captured by imaging device 202 into a binary image, but embodiments of the disclosure are not limited thereto.

Binarizer 302 generates a binary image of the captured image. However, the binary image may contain noises generated by unwanted electronic signals, by the environment, or interference source 216.

To remove (or at least weaken) the noises before any further process, positioning device 206 may further include filter 304. Filter 304 can be a packaged functional hardware unit designed for use with other components (e.g., portions of an integrated circuit) or a part of a program (stored on a computer readable medium) that performs a particular function, so as to filter the pixels corresponding to interference source 216, for example. It should be noted that, filter 304 may also filter other noises, and if the binary image has very few noises, filter 304 may not be provided.

Figure 4B:
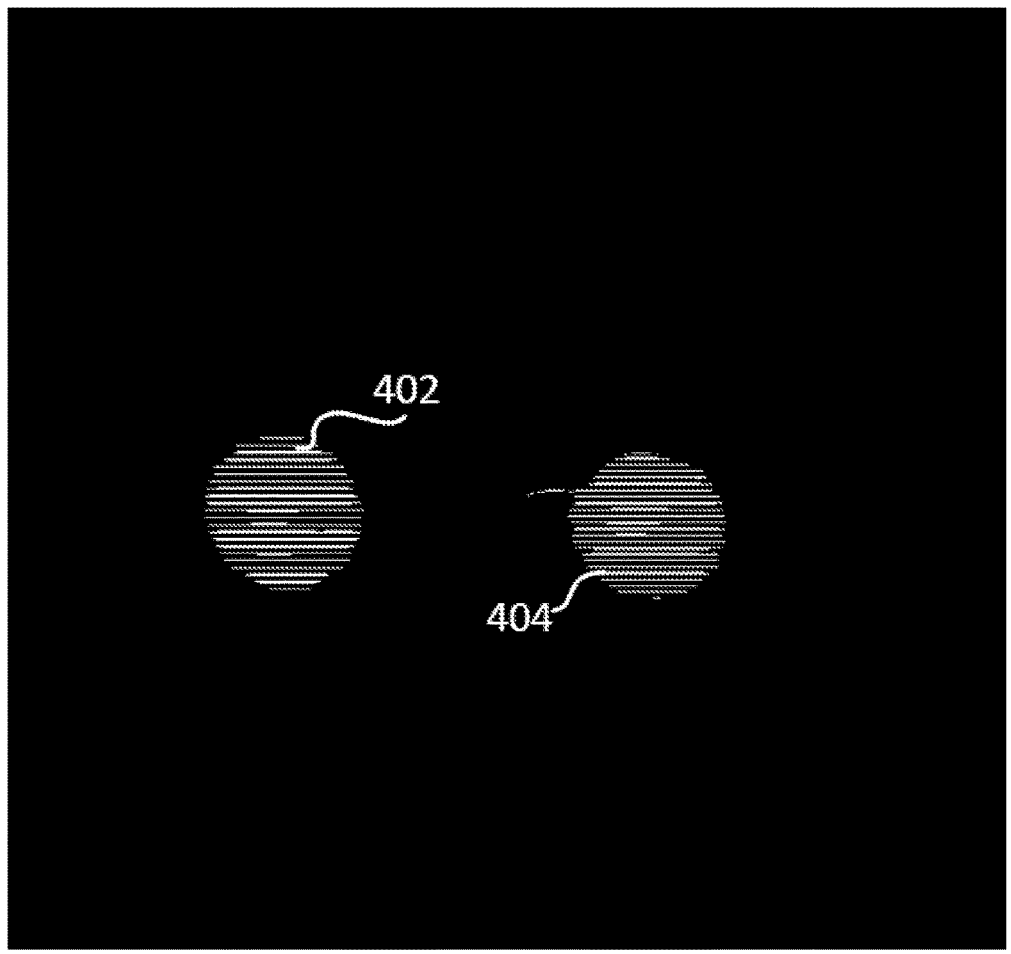

Because the stripes that signal sources 212 and 214 generates on the image are the key for positioning signal source 214, noises on the image other than the stripes will be filtered in a rapid filtering process performed by filter 304. FIG. 4B illustrates an exemplary image generated by filter 304.

As shown in FIG. 4B, noise pixels generated by interference source 216 (e.g., the lamp) is filtered by filter 304. Therefore, only white pixels 402 and 404 corresponding to signal sources 212 and 214 are left in FIG. 4B.

In some embodiments, stripes on the image may be horizontal stripes. The rapid filtering process may include steps described as below.

In a first filtering step, noise areas vertically wider than a first threshold value (i.e., vertically too wider to be horizontal stripes) may be filtered. During a first scan from top to bottom and from left to right, a vertical rectangular area of 1×(2N+1) pixels centered at a first pixel having a first pixel value of the first value $P_a$ (e.g., "1") is established, wherein N is an integer greater than 1. That is, the first threshold value is 2N+1. In this case, if N is set appropriately and no symmetric pixels having a second pixel value of the second value $P_b$ (e.g., "0") exist in the vertical rectangular area, it is indicated that at least one end of the vertical rectangular area still falls in the stripe and the first pixel is not in the stripe. The first pixel may be a noise pixel and will be marked.

Therefore, on the other hand, if symmetric pixels having a second pixel value of the second value $P_b$ (e.g., "0") exist in the vertical rectangular area, it is indicated that the vertical rectangular area is vertically narrow enough to be a horizontal stripe and the first pixel belong to the horizontal stripe. With the process of scanning, all pixels of the image will be tested, and those pixels being marked during the first filtering step will be assigned with the second value $P_b$, indicating those pixels being noise pixels.

After the above process, the noise areas that are vertically not narrow enough to be stripes may be filtered. For those noise areas having similar widths as the stripes, however, some of the noise areas may still be kept. A second filtering step may be further performed to remove such noise areas.

In the second filtering step, noise areas horizontally narrower than a second threshold value (i.e., horizontally narrower than the horizontal stripes) may be filtered. During a second scan from top to bottom and from left to right, a horizontal rectangular area of (2L+1)×1 pixels centered at a first pixel having a first pixel value of the first value $P_a$ (e.g., "1") is established, wherein L is an integer greater than 1. That is, the second threshold value is 2L+1. In this case, if L is set appropriately and no symmetric pixels having a second pixel value of the second value $P_b$ (e.g., "0") exist in the horizontal rectangular area, it is indicated that at least one end of the horizontal rectangular area still falls in the stripes. Therefore, on the other hand, if symmetric pixels having a second pixel value of the second value $P_b$ (e.g., "0") exist in the horizontal rectangular area, it is indicated that the horizontal rectangular area is horizontally too narrow to be a horizontal stripe. In this case, the first pixel does not belong to a stripe and is a noise pixel. The first pixel will be marked accordingly. With the process of scanning, all pixels of the image will be tested, and those pixels being marked during the second filtering step will be assigned with the second value $P_b$, indicating those pixels being noise pixels.

Thus, by performing the rapid filtering process including the first filtering step and the second filtering step, background noises in a complete shape are effectively filtered. That is, only pixels for stripes are retained in the image.

To identify a stripe, the pixels for one stripe should be found and connected to form a connected domain corresponding to the stripe. Thus, the filtered image may be input to connecting unit 306.

Connecting unit 306 of FIG. 3 can be a packaged functional hardware unit designed for use with other components (e.g., portions of an integrated circuit) or a part of a program (stored on a computer readable medium) that performs a connecting process, so as to connect neighboring pixels having the first pixel value $P_a$ to form a plurality of connected domains. For example, when Pixel A and Pixel B are in a four-neighborhood or an 8-neighborhood, Pixel A and Pixel B are considered as being connected in one connected domain. In the four-neighborhood, if coordinates of Pixel A are (x, y), coordinates of Pixel B may be any one of (x−1, y), (x+1, y), (x, y−1), and (x, y+1). In the eight-neighborhood, if coordinates of Pixel A are (x, y), coordinates of Pixel B may be any one of (x−1, y), (x+1, y), (x, y−1), (x, y+1), (x−1, y−1), (x+1, y−1), (x+1, y+1), and (x−1, y+1). When Pixel C is further connected to either Pixel A or Pixel B, Pixel C also belongs to the same connected domain as Pixel A and Pixel B. The connecting process may include a Two-Pass method, a Seed-Filling method, or the like.

Figure 4C:
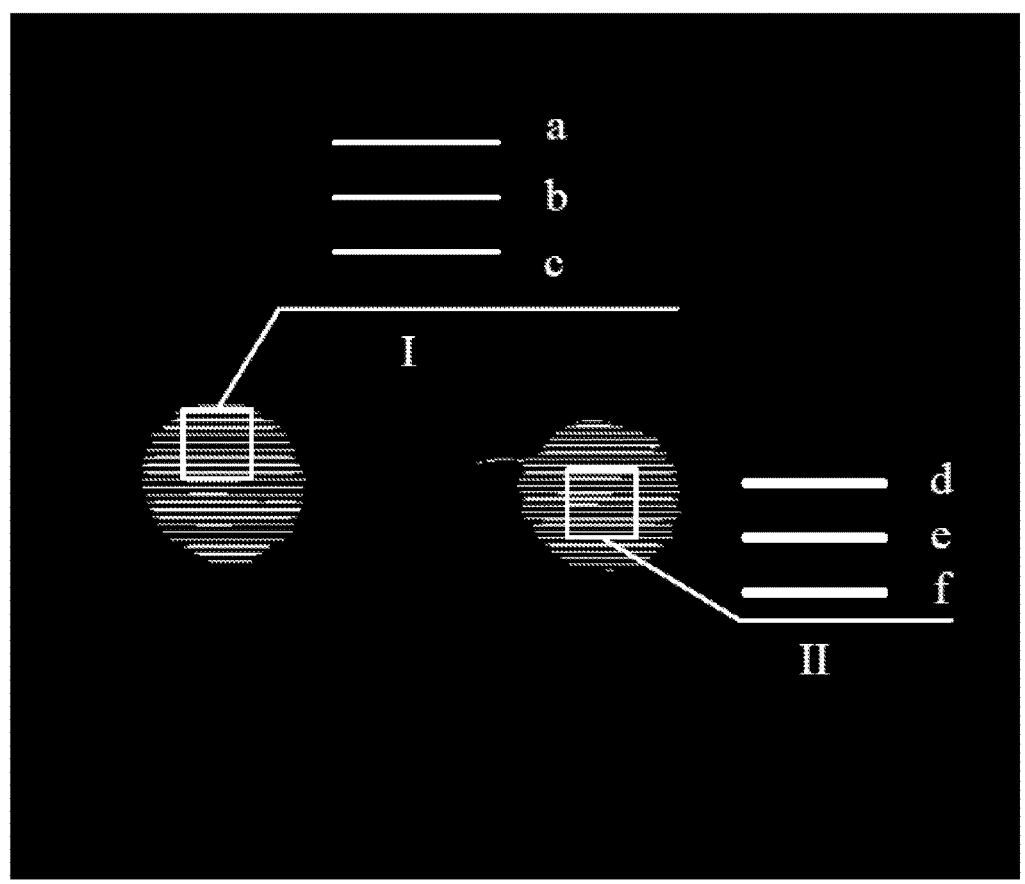

By means of connecting unit 306, the stripes are identified as connected domains in the binary image. It is possible that some of the noise pixels that are still kept in the binary image may be connected to form a connected noise domain. If the rapid filtering process is not performed, the connected noise domain need to be further filtered. If the rapid filtering process is performed, the connected noise domain of remained noise pixels, may not need to be further filtered. FIG. 4C illustrates an exemplary image generated by connecting unit 306.

As shown in FIG. 4C, pixels belonging to a same stripe are connected by connecting unit 306 to form several connected domains in the image. For example, areas I and II are magnified to illustrate exemplary connected domains a, b, c, d, e, and f included therein.

Because a signal source may generate a plurality of stripes on the image, these connected domains corresponding to the stripes may be further grouped into domain groups corresponding to the signal sources.

Domain analyzer 308 of FIG. 3 can be a packaged functional hardware unit designed for use with other components (e.g., portions of an integrated circuit) or a part of a program (stored on a computer readable medium) that groups the plurality of connected domains into domain groups corresponding to signal sources 212 and 214. Each of the connected domains corresponds to one stripe generated on the image by signal source 212 or 214.

In some embodiments, domain analyzer 308 may determine whether two domains belong to a same group by performing a grouping sub-process. For example, in the grouping sub-process, a distance between a center of a reference domain and a candidate domain is calculated, the candidate domain may be assigned to a domain group same as the domain group of the reference domain if the distance is less than a half of a sum of domain lengths of the reference domain and the candidate domain, and the candidate domain may be assigned to a domain group different from the domain group of the reference domain if the distance is greater than or equal to a half of a sum of domain lengths of the reference domain and the candidate domain. The above grouping sub-process will be further discussed with reference to FIG. 5.

Figure 4D:
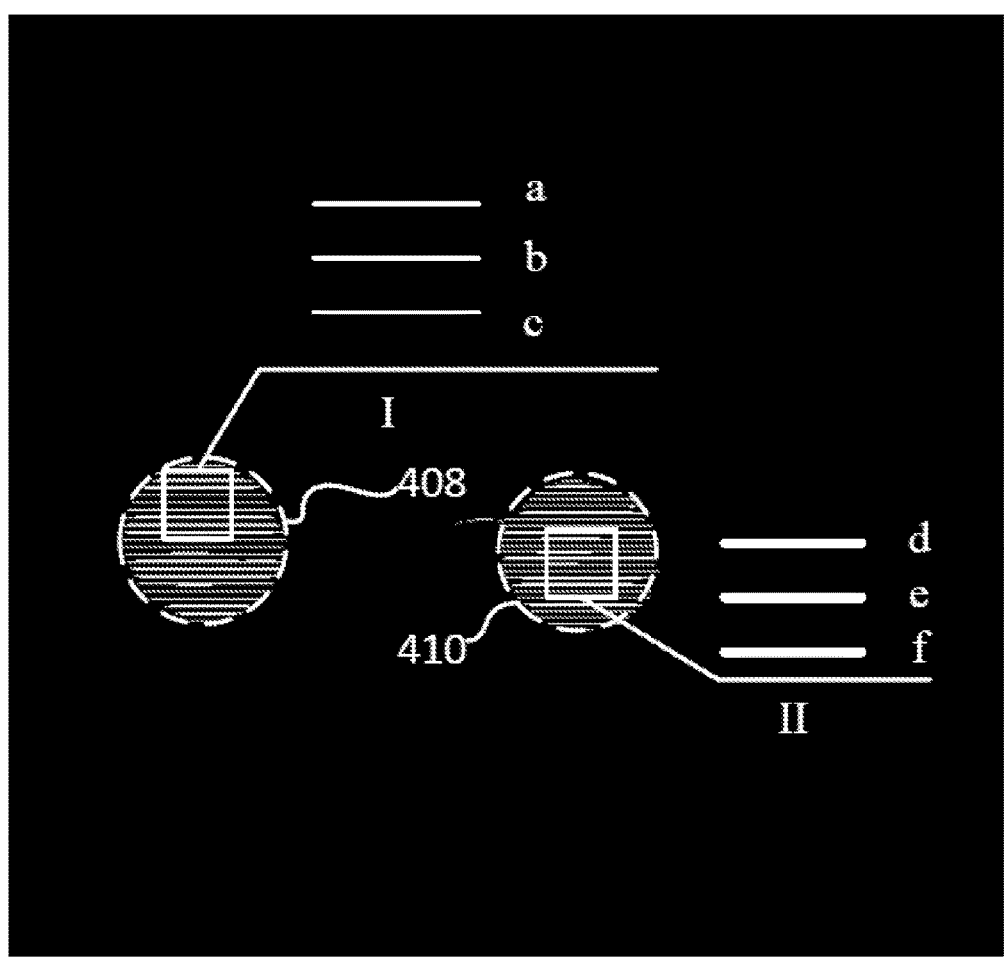
Figure 5:
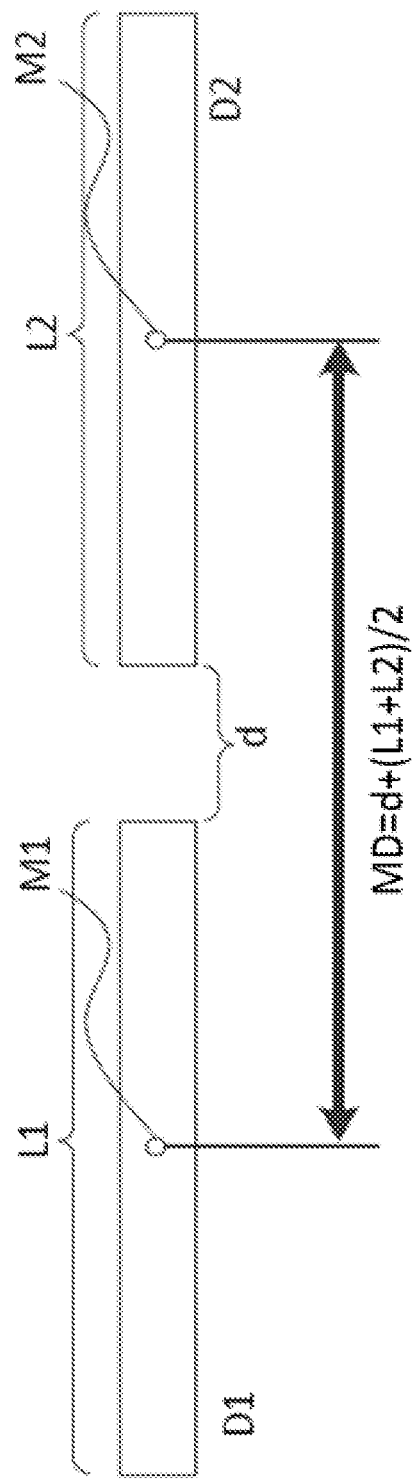
FIG. 5 illustrates a schematic diagram of determining whether two domains belong to a same group, according to embodiments of the disclosure.

FIG. 5 illustrates a schematic diagram of determining whether two domains belong to a same group. In some embodiments, point M1 is a center of a first connected domain D1 having a domain length L1, and point M2 is a center of a second connected domain D2 having a domain length L2. The domain length may be measured by pixels. The first connected domain D1 and the second connected domain D2 do not belong to a same domain group as they are not overlapped with each other in the vertical direction. A distance MD between the two center points M1 and M2 can be a sum of a half of a sum of domain lengths of the two connected domains and a distance d between respective ends of the two connected domains D1 and D2. That is, MD=d+ (L1+L2)/2. When two connected domains are not in the same domain group (that is, not overlapped in the vertical direction), d is greater than or equal to "0". Thus, MD is greater than or equal to (L1+L2)/2. In other words, when a distance between centers of two connected domains is less than a half of a sum of domain lengths of the two connected domains, the two connected domains may be assigned into a same domain group. Otherwise, when the distance between the centers of the two connected domains is greater than or equal to a half of a sum of domain lengths of the two connected domains, the two connected domains are respectively assigned into a first domain group 408 and a second domain group 410, as shown in FIG. 4D.

FIG. 4D illustrates an exemplary image generated by domain analyzer 308. In FIG. 4D, the connected domains are grouped by domain analyzer 308 into two domain groups 408 and 410 corresponding to signal sources 212 and 214. For example, according to the above grouping sub-process, connected domains a, b, and c may be grouped as a part of the first domain group such as a domain group 408, and connected domains d, e, and f may be grouped as a part of the second domain group such as a domain group 410. It is appreciated that, dashed circles are merely displayed in the figure to indicate the connected domains have been grouped.

In order to provide a better efficiency to domain analyzer 308, domain analyzer 308 may further perform three alternative grouping methods based on the above grouping process, as discussed below.

In a first grouping method, domain analyzer 308 may sort the plurality of connected domains by domain lengths into a sorted list, and set adjacent connected domains on the sorted list as the two connected domains. That is, in the first grouping method, the two connected domains for the above-described grouping process includes two adjacent connected domains among the connected domains sorted according to lengths. Then, the first grouping method may perform the above-described grouping process on every two adjacent connected domains on the sorted list in a sequence. That is, if a distance between centers of every two adjacent connected domains is less than a half of a sum of domain lengths of the two adjacent connected domains, the two adjacent connected domains are grouped into a common or same domain group. Therefore, all connected domains may be subject to the grouping process until all connected domains are assigned to a domain group.

In the first grouping method, domain analyzer 308 may sort the plurality of connected domains into a sorted list according to their domain lengths, from longer ones to shorter ones. Then domain analyzer 308 may select a first connected domain on the sorted list as a reference domain. For example, domain analyzer 308 selects a connected domain having a longest domain length as the reference domain. The reference domain (e.g., the connected domain having a longest domain length) may be assigned to either a first domain group or a second domain group. Domain analyzer 308 may further perform a grouping process on each of the rest of the plurality of connected domains in a sequence, to compares each pair of adjacent domains on the sorted list in a descending order, each pair contains two adjacent domains on the sorted list. In the comparison, if the distance between center points of the two domains is less than half of the sum of the lengths of two domains in a neighboring pair, the two adjacent domains may belong to a same signal source, and domain analyzer 308 may assign them to a same group; otherwise, the two adjacent domains may belong to different light sources, and domain analyzer 308 may assign them to two different domain groups.

The grouping process may include selecting a next connected domain adjacent to the reference domain on the sorted list as a candidate domain; assigning the candidate domain to either the first domain group or the second domain group by performing the grouping sub-process on the candidate domain based the reference domain; and updating the candidate domain a next reference domain. For example, the connected domain having a longest domain length is selected as a reference domain, and the next connected domain adjacent to the reference domain on the sorted list, as the candidate domain, is a connected domain having a second longest domain length. In one embodiment, the connected domain having a longest domain length is assigned to the first domain group, and the connected domain having a second longest domain length may be assigned to the second domain group depending on whether the distance between center points of the two domains is less than half of the sum of the lengths of two domains. Then, the connected domain having a second longest domain length, as the current candidate domain, may be updated to the next reference domain, and the grouping process will be iteratively performed.

In a second grouping method, domain analyzer 308 may select a connected domain having a longest pixel length as a reference domain, assign the reference domain to either a first domain group or a second domain, and perform a grouping process on each of the rest of the plurality of connected domains in a sequence. The grouping process may include selecting a next ungrouped connected domain as a candidate domain, and assigning the candidate domain to either the first domain group or the second domain group by performing the grouping sub-process on the candidate domain based on the reference domain. In the second grouping method, the connected domain having a longest pixel length is always the reference domain, and each of the rest of the connected domains will be a candidate domain for the grouping sub-process. Thus, the second grouping method may be performed in parallel.

In a third grouping method, the plurality of connected domains may be sorted into a list according to their domain lengths, a longest connected domain on the sorted list may be selected as a reference domain and a second longest connected domain on the sorted list may be selected as a candidate domain, and the reference domain may be assigned to a first domain group or a second domain group. Then, the grouping sub-process may be performed on the candidate domain based on the reference domain, so as to determine whether they belong to a same domain group. If they belong to the same group, domain analyzer 308 may tag one of the two domains, which is located at an upmost position in the image, as a "TOP" domain, and tag the other one as a "BOTTOM" domain, for example. Then a grouping process may be performed on each of the rest of the plurality of connected domains in a sequence, the grouping process may include determining, among connected domains assigned to a domain group, a topmost connected domain that is located on a topmost position and a bottommost connected domain that is located on a bottommost position; selecting a next longest connected domain on the sorted list as a candidate domain; and performing the grouping sub-process on the candidate domain based on the topmost connected domain as the reference domain or the bottommost connected domain as the reference domain. The third grouping method may be applied to domains that form an irregular shape.

Therefore, domain analyzer 308 may analyze and group the connected domains by any of the above methods or any other method, and may not be limited by the above examples. In additional, the connected noise domain consisting of noise pixels cannot be grouped and may be further filtered.

It is also noted that, in some embodiments, the background noises need not to be filtered by the rapid filtering process including the first filtering step and the second filtering step, mentioned above. If the rapid filtering process is not performed, the binary image generated by the binarizer 302 may be input to connecting unit 306 to perform the above-described connecting process and grouping process. The connected noise domain consisting of noise pixels can be grouped and be filter after the above-described connecting process and grouping process.

Upon the connected domains being grouped by domain analyzer 308, the domain groups corresponding to signal sources 212 and 214 have been formed and identified.

After the domain groups are formed and identified, positions for the domain groups should be further determined. Generally, a mass center of a domain group may be considered as a position of the domain group corresponding to a position of a signal source.

Center analyzer 310 of FIG. 3 can be a packaged functional hardware unit designed for use with other components (e.g., portions of an integrated circuit) or a part of a program (stored on a computer readable medium) that performs a centering process, so as to determine centers of mass for the domain groups corresponding to signal sources 212 and 214, that is, positions of signal sources 212 and 214 in a planar plane.

In some embodiments, the centering process may include determining a center point of a connected domain having a longest domain length within the domain group, setting a square having a side length that is equal to the longest domain length and centered on the center point, reading pixel values of pixels within the square, and determining the mass center of the square.

That is, the mass center may be determined using the equation below.

$$(x_c, y_c) = \left( \frac{\sum_{i=1}^{n} xi \times P_i}{\sum_{i=1}^{n} P_i}, \frac{\sum_{i=1}^{n} yi \times P_i}{\sum_{i=1}^{n} P_i} \right)$$ Equation 1.1

In Equation 1.1, $P_i$ is a grayscale value for a corresponding pixel (xi, yi).

In another embodiment, the centering process may include reading pixel values of pixels within the domain group, and calculating the mass center of the domain group.

$$(x_c, y_c) = \left( \frac{\sum_{i=1}^{n} xi \times P_i}{\sum_{i=1}^{n} P_i}, \frac{\sum_{i=1}^{n} yi \times P_i}{\sum_{i=1}^{n} P_i} \right)$$ Equation 1.2

In Equation 1.2, $P_i$ also is a grayscale value for a corresponding pixel (xi, yi).

Center analyzer 310 may utilize any other centering process to determine the positions of the domain groups, and may not be limited by the above examples.

Thus, positions for signal sources 212 and 214 may be determined by image processing apparatus 200 disclosed above. When positions for signal sources 212 and 214 are determined in each frame image, movement trajectories of signal sources 212 and 214 may be identified.

As discussed above, the image processing apparatus may further provide an object identifying function, so that identities for the signal sources may be determined.

Figure 6:
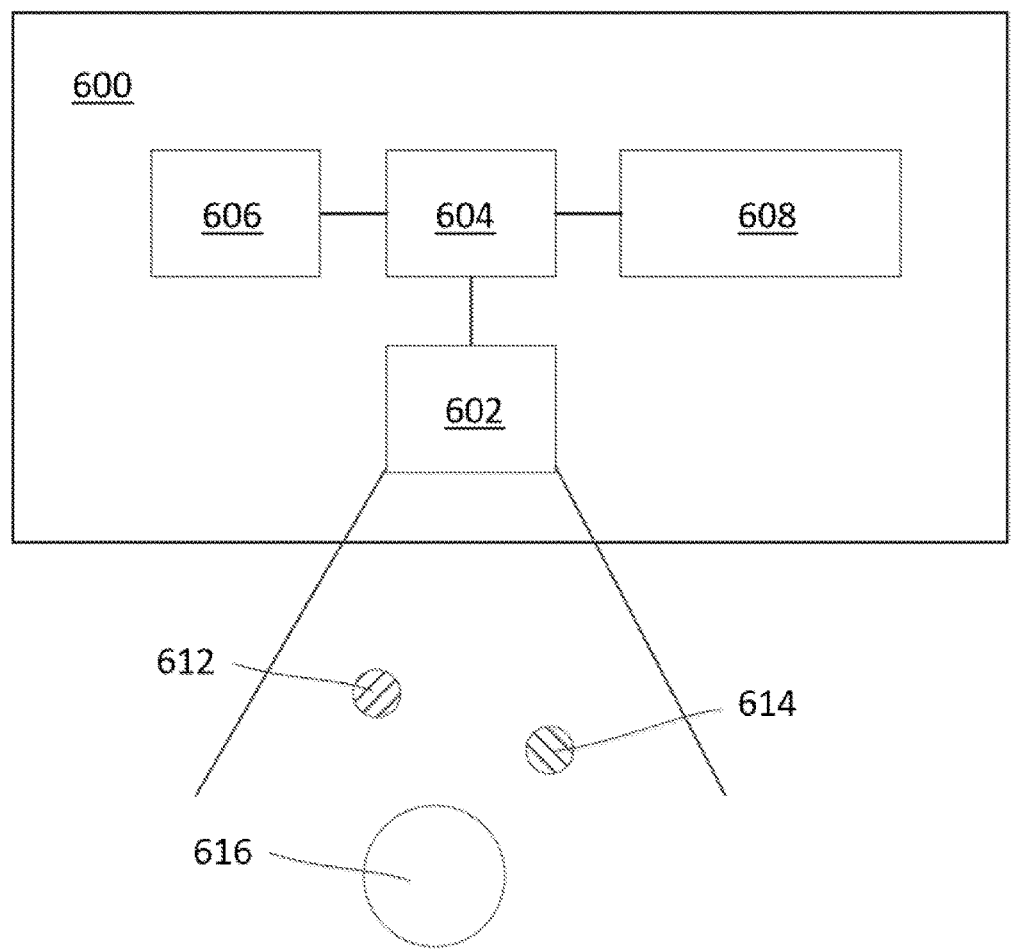
FIG. 6 illustrates a schematic diagram of another image processing apparatus, according to embodiments of the disclosure.

FIG. 6 illustrates a schematic diagram of an image processing apparatus 600 according to embodiments of the disclosure.

In some embodiment, image processing apparatus 600 may include an imaging device 602, a memory device 604, a positioning device 606, and an identity determining device 608. Imaging device 602, memory device 604, and positioning device 606 perform the same or similar functions as imaging device 202, memory device 204, and positioning device 206 described above with reference to FIG. 2. Similarly, first and second signal sources 612 and 614, and an interference source 616 can be the same or similar to first and second signal sources 212 and 214, and interference source 216 described with reference to FIG. 2. Description for the above similar elements will be omitted for clarity.

Identity determining device 608 may determine identities for signal sources based on frequency information of the domain group corresponding to the signal sources.

Figure 7:
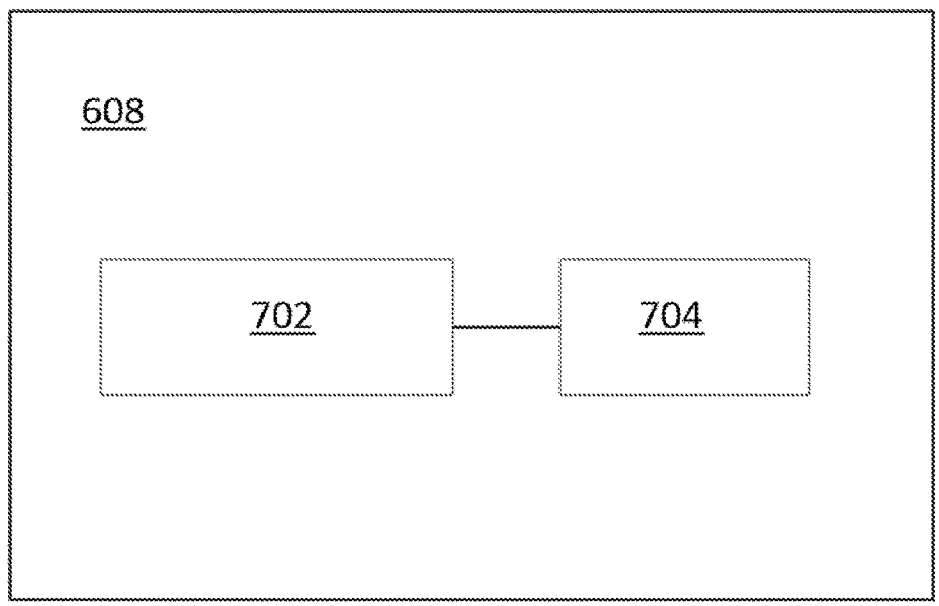
FIG. 7 illustrates a block diagram of an identity determining device, according to embodiments of the disclosure.

FIG. 7 illustrates a block diagram of identity determining device 608 according to embodiments of the disclosure.

In some embodiments, identity determining device 608 may include a frequency information analyzer 702 and an identifying unit 704, as shown in FIG. 7.

As discussed above, when signal sources 612 and 614 produce light pulses at a pulse frequency, stripes having a pattern may appear on the image. The pattern may include a width of the stripes and a width of gaps between the stripes, and the pattern is directly related to the pulse frequencies of signal sources 612 and 614. Therefore, signal sources 612 and 614 having respective specific pulse frequencies may be identified by the pattern of the stripes. That is, when frequency information obtained from a pattern of stripes displayed on the image corresponds to pre-stored feature information of a signal source, the signal source may be identified.

Frequency information analyzer 702 can be a packaged functional hardware unit designed for use with other components (e.g., portions of an integrated circuit) or a part of a program (stored on a computer readable medium) that performs a frequency calculating process, so as to calculate, frequency information of a domain group corresponding to a signal source.

In some embodiments, the frequency calculating process performed by frequency information analyzer 702 may determine the frequency information of the domain group by measuring a pattern of the domain group. For example, frequency information analyzer 702 may measure a width of connected domains and/or a width of gaps between the connected domains in the domain group.

Generally, however, the width of the connected domains and/or the width of gaps between the connected domains are difficult to be measured directly from the image. Therefore, a Fast Fourier Transform (FFT) may be performed on the connected domains of the domain group, so that the frequency information of the signal source can be easily obtained.

Memory device 604 may further store feature information for the signal source. The feature information may be pre-stored in a look-up table.

And identifying unit 704 may identify an identity for the signal source based on the calculated frequency information and the feature information.

For example, with reference back to FIG. 4D, frequency information analyzer 702 identifies that domain group 408 corresponds to a signal source emitting light pulses at 10 Hz and domain group 410 corresponds to another signal source emitting light pulses at 20 Hz. Memory device 604 may store feature information indicating that first signal source 612 emits light pulses at 10 Hz and second signal source 614 emit light pulses at 20 Hz. Then, identifying unit 704 may identify that domain group 408 corresponds to first signal source 612 and domain group 410 corresponds to second signal source 614.

Thus, positions and identities for first and second signal sources 612 and 614 may be determined by image processing apparatus 600, even under interference from interference source 616.

Figure 8:
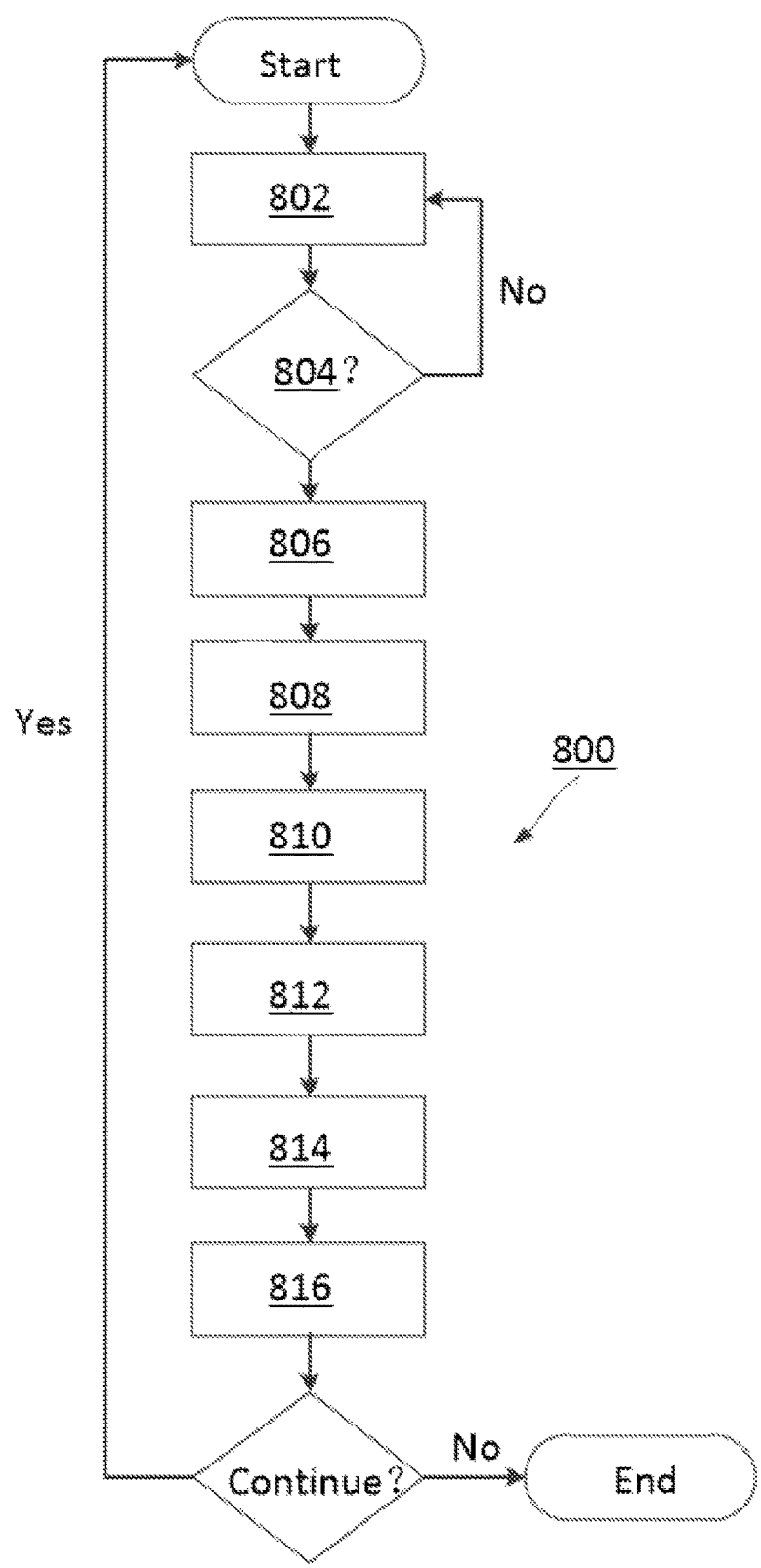
FIG. 8 illustrates a flow chart of an exemplary method for an image processing apparatus of FIG. 6, according to embodiments of the present disclosure.

FIG. 8 illustrates a flow chart of an exemplary method 800 for image processing apparatus 600 of FIG. 6, according to embodiments of the present disclosure. The flow chart includes steps 802 through 816. It is appreciated that an image processing apparatus (e.g., image processing apparatus 600 of FIG. 6 can perform method 800.

In step 802, image processing apparatus 600 may receive an image. The image may be captured by an imaging device or input by another device (e.g., an I/O unit). For example, the image may be captured by imaging device 602 of image processing apparatus 600, as discussed above. In some embodiments, the image contains an interference source and a signal source(s).

In step 804, image processing apparatus 600 determines if the image contains stripes. In some embodiment, imaging device 602 scans and reads the pixel data in a row-by-row fashion. And a signal source to be captured may produce light pulses at a pulse frequency. When the pulse frequency of the signal source is higher than a scanning frequency of the image sensor, an artifact (or image distortion) including a pattern of alternating dark/white stripes may appear in the image. When the image contains the stripes, method 800 goes to step 806. Otherwise, when the image contains no stripes, method 800 goes back to step 802, receiving another image.

The stripes may be generated by signal sources emitting light pulses at a pulse frequency, and may have a pattern. The pattern includes a width of the stripes and a width of gaps between the stripes.

In step 806, the image is binarized by image processing apparatus 600. A pixel value for each pixel of the image is binarized into a first pixel value Pa or a second pixel value Pb. The pixels may include pixels corresponding to the interference source and the signal source(s). For example, the first pixel value Pa equals to "1", and the second pixel value Pb equals to "0".

In step 808, the binarized image may be further filtered by image processing apparatus 600, so that the pixels corresponding to the interference source may be filtered.

In step 810, a connecting process is performed by image processing apparatus 600, so as to connect neighboring pixels having the first pixel value Pa to form a plurality of connected domains associated with the plurality of stripes.

In step 812, image processing apparatus 600 may group the plurality of connected domains into domain groups corresponding to the signal sources.

In step 814, image processing apparatus 600 may determine locations of the domain groups corresponding to the signal sources. That is, the signal sources may be positioned by image processing apparatus 600.

In step 816, image processing apparatus 600 may determine identities of the signal sources based on frequency information of the domain group corresponding to the signal sources. Therefore, the signal sources may be distinguished.

Image processing apparatus 600 may further determine if method 800 should continue. For example, when a new image is acquired by image processing apparatus 600 for processing, method 800 may go back to the start point and receive the new image. And when no further image should be processed or image processing apparatus 600 receives an instruction to quite method 800, method 800 may end.

As discussed above, the positions for first and second signal sources 612 and 614 are determined based on a planar image. Therefore, the positions that are determined by the above embodiments are only two-dimensional.

Embodiments of the disclosure further provide an image processing system for identifying positions of signal sources in a three-dimensional (3D) space.

Figure 9:
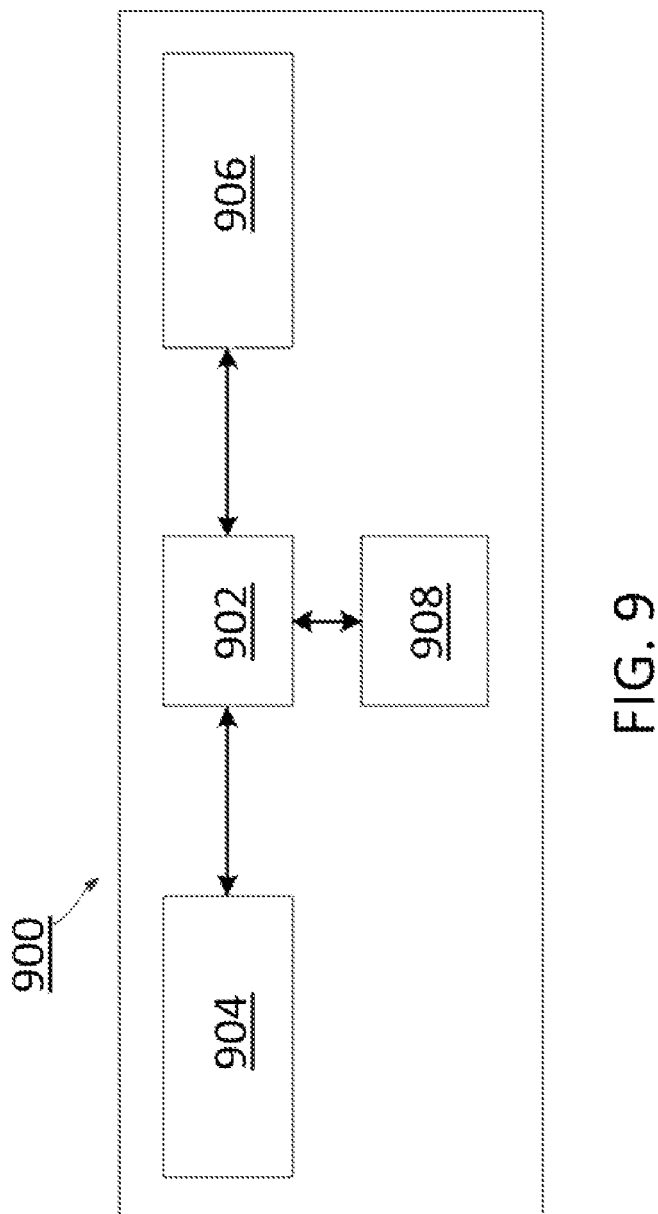
FIG. 9 illustrates a block diagram of an image processing system for identifying positions of signal sources in a three-dimensional space, according to embodiments of the disclosure.

FIG. 9 illustrates a block diagram of an image processing system 900 for identifying positions of signal sources in a three-dimensional space, according to embodiments of the disclosure.

As shown in FIG. 9, image processing system 900 may include an image processor 902, a first image processing apparatus 904, a second image processing apparatus 906 that is separated from apparatus 904 by a distance, and an I/O unit 908.

First and second image processing apparatuses 904 and 906 are similar to or the same as image processing apparatus 600 of FIG. 6 described above, and description of which will be omitted herein for clarity.

First image processing apparatus 904 may generate a first identifying result containing positions of the signal sources on a first plane. And similarly, second image processing apparatus 906 may generate a second identifying result containing positions of the signal sources on a second plane.

Image processor 902 can be a packaged functional hardware unit designed for use with other components (e.g., portions of an integrated circuit) or a part of a program (stored on a computer readable medium) that performs a particular function, so as to receive the first and second identifying results from the two image processing apparatuses and generate the positions of the signal sources in a three-dimensional space according to the first and second identifying results and the distance between apparatuses 904 and 906.

I/O unit 908 may be configured for communication between image processing system 900 and other devices. For example, I/O unit 908 may exchange data through any type of wired or wireless network that may allow transmitting and receiving data. For example, I/O unit 908 may exchange data through a regional or nationwide cellular network, a local wireless network (e.g., Bluetooth™, near field communication, infrared, or WiFi), and/or a wired network (e.g., wired through cables). In some embodiments, I/O unit 908 may send the positions of the signal sources in a three-dimensional space to a user interface for display.

It should be noted that, image processing system 900 may also perform above-mentioned method 800 according to some embodiments of the disclosure.

Figure 10:
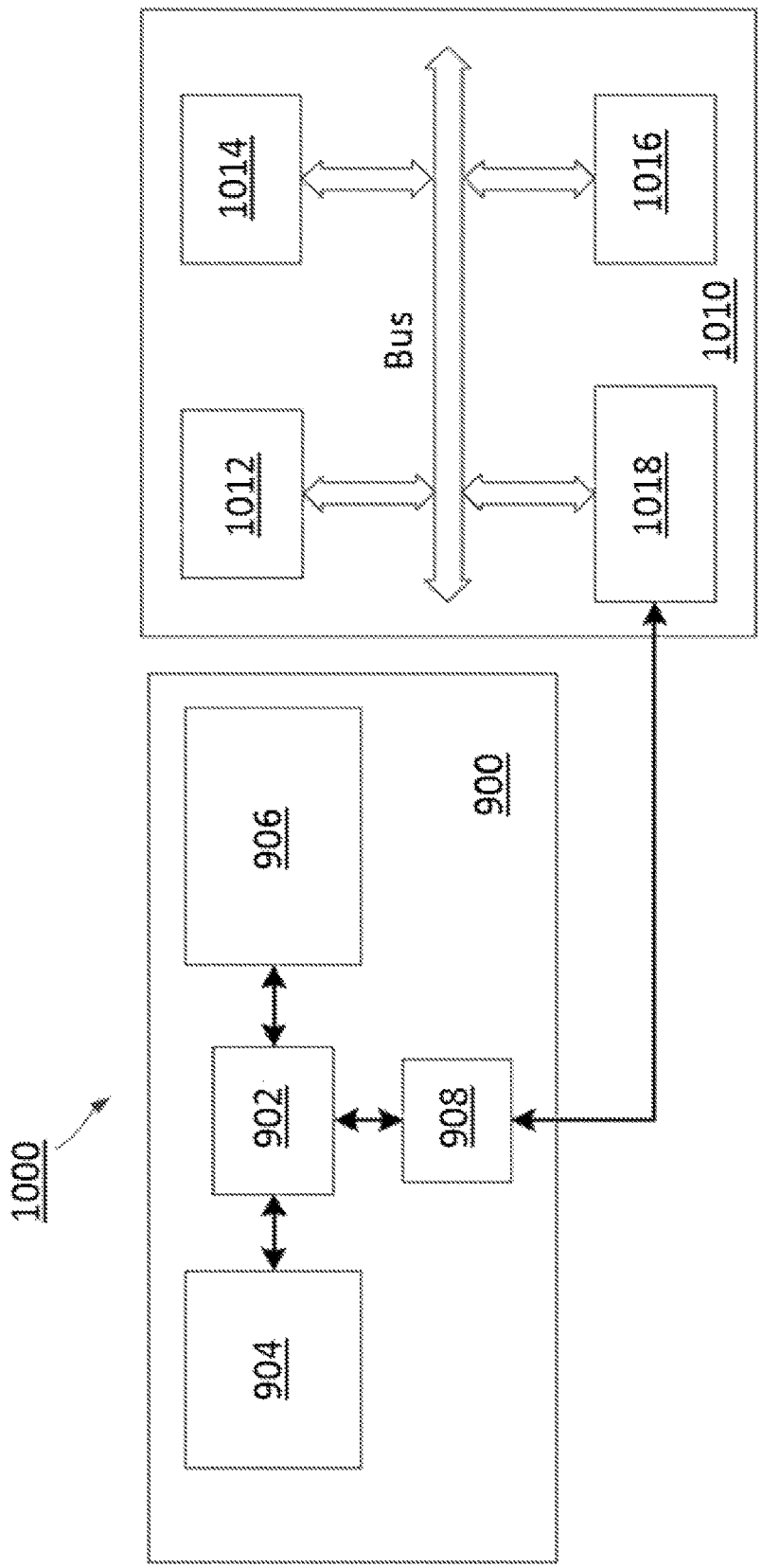
FIG. 10 illustrates an exemplary signal source identifying system, according to embodiments of the disclosure.

FIG. 10 illustrates an exemplary signal source identifying system 1000 according to embodiments of the disclosure.

As shown in FIG. 10, signal source identifying system 1000 may include image processing system 900 and a signal generating system 1010. It should be appreciated that, image processing apparatus 200 or image processing apparatus 600 can be a substitute of image processing system 900, and signal source identifying system 1000 as shown in FIG. 10 is merely an example.

Signal generating system 1010 may include a signal source 1012, a memory 1014, a processor 1016, and a communication unit 1018.

Signal source 1012 may emit visible light pulses at a pulse frequency to generate stripes in an image when being captured by, for example, image processing system 900. The stripes may have a pattern, including a width of the stripes and a width of gaps between the stripes.

Memory 1014 may include any appropriate type of mass storage provided to store any type of information that processor 1016 needs to operate, such as information on which pattern signal source 1012 should generate on the image. Memory 1014 may be a volatile or non-volatile, magnetic, semiconductor, tape, optical, removable, non-removable, or other type of storage device or tangible and/or non-transitory computer-readable medium including, but not limited to, a ROM, a flash memory, a dynamic RAM, a cache, a register, and a static RAM. Memory 1014 may be configured to store one or more computer programs that may be executed by processor 1016.

Processor 1016 may be configured to execute the one or more computer programs stored in memory 1014, as described above.

Communication unit 1018 may be configured for communication between signal generating system 1010 and other devices, such as image processing system 900.

Figure 11:
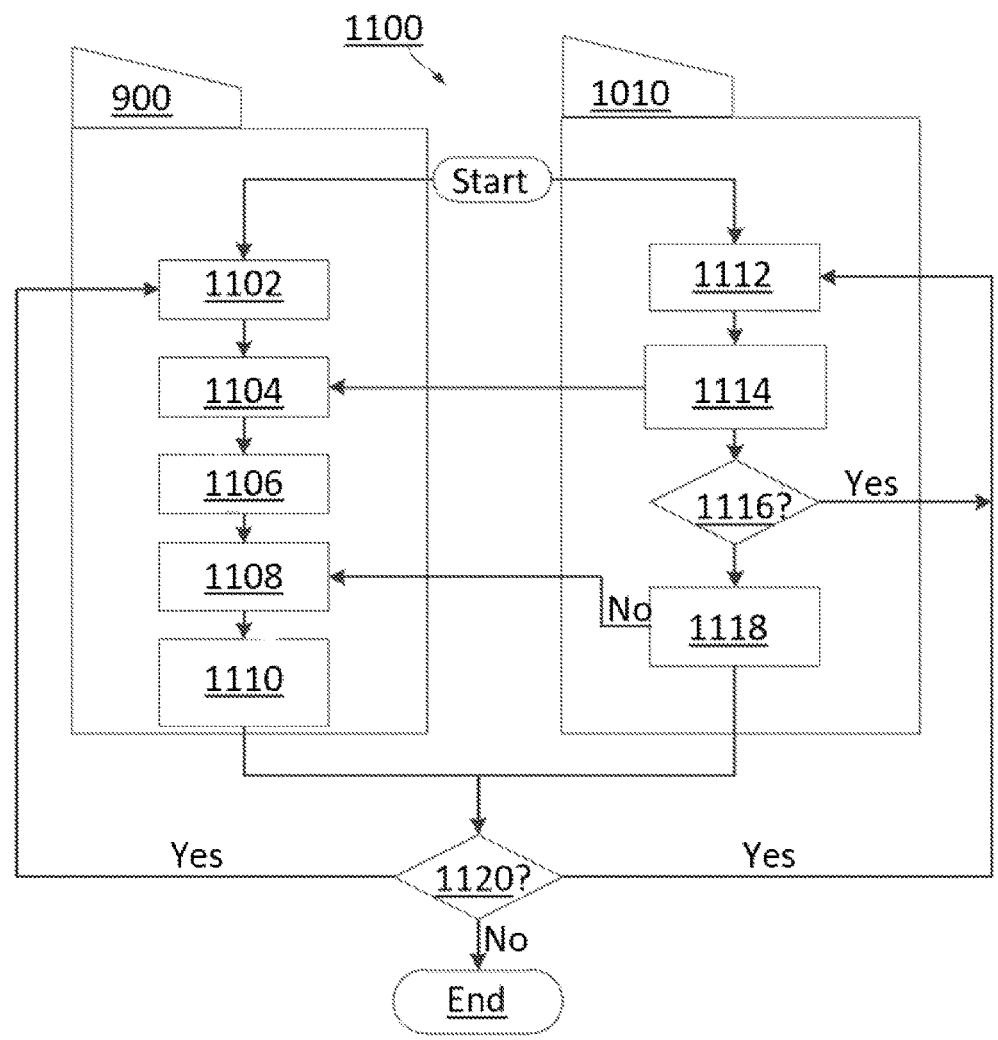
FIG. 11 illustrates a flow chart of an exemplary method for operating the signal source identifying system, according to embodiments of the disclosure.

FIG. 11 illustrates a flow chart 1100 of an exemplary method for operating signal source identifying system 1000, according to embodiments of the disclosure.

The flow chart 1100 may include steps 1102 through 1120, wherein steps 1102 through 1110 are applied on image processing system 900 and steps 1112 through 1118 are applied on signal generating system 1010. Steps 1102 through 1120 will be discussed as below. Image processing system 900 and signal generating system 1010 are illustrated for exemplary purposes only, and it is appreciated that other image processing system and signal generating systems can perform the exemplary methods of FIG. 11.

After image processing system 900 is powered on, in step 1102, image processing system 900 is initialized. For example, image sampling rate and line scanning rate may be set for image processing system 900.

Similarly, after signal generating system 1010 is powered on, in step 1112, signal generating system 1010 is initialized by setting pulse frequency of signal source 1012. The pulse frequency of signal source 1012 may be pre-stored in memory 1014.

Then, in step 1114, signals (e.g., light pulses) are emitted from signal source 1012, so that image processing system 900 may capture the signals.

Correspondingly, in step 1104, image processing system 900 may capture images for the signals. The images contain stripes generated by the light pulses.

In step 1106, image processing system 900 may locate and identify signal source 1012 by methods described above.

In step 1108, image processing system 900 may send results generated by positioning and identifying signal source 1012 to image processor 902 of FIG. 9 for further processing, such as step 1110.

After receiving the processed results, in step 1110, image processing system 900 may display the results to a user interface. For example, the user interface may be a graphic user interface (GUI) generated by image processing system 900, or a display that is connected to image processing system 900.

When image processing system 900 is positioning and identifying signal source 1012, signal generating system 1010 may determine if any other input is received. The input may be an interruption signal for interrupting signal generating system 1010. Therefore, when other input is received, signal generating system 1010 may go back to step 1112 to set a pulse frequency of signal source 1012 again. And when no other input is received at step 1116, signal generating system 1010 may go to step 1118.

In some embodiments, signal generating system 1010 may receive some other input information that should be transmitted to image processing system 900. For example, a user may operate on a console connected to signal generating system 1010, so that instructions or the input information may be received by signal generating system 1010 and then transmitted to image processing system 900. Therefore, in step 1118, signal generating system 1010 may send the other input information to image process 902 of image processing system 900 via communication between I/O unit 908 and communication unit 1018.

Then, the flow chart 1100 may determine if it continues. When signals still need to be generated by signal source 1012 of signal generating system 1010 and captured by image processing system 900, the flow chart 1100 respectively goes back to step 1102 and step 1112 for image processing system 900 and signal generating system 1010, respectively. Otherwise, the flow chart 1100 ends.

With the above devices, apparatuses, systems, and methods, signal sources may be positioned and identified with higher accuracy, even under strong interferences.

It is appreciated that, various exemplary logic blocks, modules, circuits, and algorithm steps described with reference to the disclosure herein may be implemented as specialized electronic hardware or a combination of electronic hardware and computer software. For examples, the modules/units may be implemented by a processor executing software instructions stored in the computer-readable storage medium.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks may be substantially executed in parallel, and sometimes, they may also be executed in the reverse order, depending on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system, or a computer readable medium. Accordingly, embodiments of the present disclosure may take the form of an entirely hardware embodiment or an embodiment combining software and hardware for allowing specialized components to perform the functions described above.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, may be implemented by computer program instructions.

These computer program instructions may be provided to a processor of a computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that may direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage may be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising", "having", "containing", and "including", and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an", and "the" include plural references unless the context clearly dictates otherwise.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. An image processing apparatus for determining locations and identities of multiple light sources, comprising:
    an imaging device configured to capture an image containing a set of pixels, wherein the set of pixels comprises a first subset of pixels representing a plurality of stripes associated with the multiple light sources, and the light sources are configured to produce light pulses at a pulse frequency; the imaging device is configured to scan the light sources to capture the image;
    a memory configured to receive and store the image captured by the imaging device;
    a positioning device configured to determine locations of the multiple light sources according to the stripes; wherein the positioning device comprises:
        a binarizer configured to binarize pixel values for pixels of the image into a first pixel value or a second pixel value, wherein the first pixel value corresponds to the first subset of the pixels and a second subset of the pixels associated with a noise light source, and the second pixel value corresponds to background pixels;
        a connecting unit configured to connect neighboring pixels having the first pixel value to form a plurality of connected domains associated with the plurality of stripes;
        a domain analyzer configured to:
            group the plurality of connected domains into domain groups corresponding to the light sources;
            perform a grouping sub-process comprising: calculating a distance between a center of a reference domain and a candidate domain, assigning the candidate domain to a domain group same as the domain group of the reference domain if the distance is less than a half of a sum of domain lengths of the reference domain and the candidate domain, and assigning the candidate domain to a domain group different from the domain group of the reference domain if the distance is greater than or equal to a half of the sum;

sort the connected domains according to their domain lengths;

select a first connected domain from a list as a reference domain;

assign the reference domain to either a first or second domain group; and group the connected domains in sequence, comprising: selecting a next reference adjacent domain as a candidate domain, assigning the candidate domain to either first or second group based on the reference domain, and updating the candidate domain to the next reference domain; and a center analyzer configured to determine locations of the domain groups corresponding to the light sources; and an identity determining device configured to determine locations and identities of the multiple light sources.

2. The image processing apparatus of claim 1, wherein the positioning device further comprises a filter configured to:

receive the first pixel values and the second pixel values; and filter out pixels of an area, which is wider than a first threshold value and/or narrower than a second threshold value.

3. The image processing apparatus of claim 1, wherein the center analyzer is further configured to:

determine a domain center point of a connected domain having a longest domain length within a domain group;

setting a square having the domain center point as its center point and the longest domain length as its side length;

receive pixel values of pixels within the square; and calculate a mass center of the square as the positions of the light sources.

4. The image processing apparatus of claim 1, wherein the identity determining device further comprises:

a frequency information analyzer to calculate frequency information of the domain group corresponding to the light sources; and an identifying unit to identify, based on the frequency information, the light sources, wherein the memory device stores feature information regarding the light sources, and the identifying unit identifies the light sources based on the calculated frequency information and the stored feature information.

5. The image processing apparatus of claim 4, wherein the frequency information analyzer is further configured to:

calculate the frequency information based on the width of the stripes, or calculate the frequency information based on the width of gaps between the stripes.

6. The image processing apparatus of claim 5, wherein the frequency information analyzer performs Fast Fourier Transform on the stripes to calculate the frequency information.

7. The image processing apparatus of claim 1, wherein the stripes correspond to light pulses that are emitted by the multiple light sources at different pulse frequencies.

8. An image processing system for determining locations and identities of light sources in a space, comprising:

two image processing apparatuses, separated by a distance, the image processing apparatuses being configured to respectively generate process results for determining locations of the light sources; and a processor, connected with the two image processing apparatuses, the processor being configured to receive the process results from the two image processing apparatuses and determine positions of the light sources in the space based on the process results and the distance;

wherein each of the two image processing apparatuses comprises:

an imaging device configured to capture an image containing a set of pixels, wherein the set of pixels comprises a first subset of pixels representing a plurality of stripes associated with the multiple light sources, and the light sources are configured to produce light pulses at a pulse frequency;

the imaging device is configured to scan the light sources to capture the image;

a memory configured to receive and store the image captured by the imaging device;

a positioning device configured to determine locations of the multiple light sources according to the stripes;

wherein the positioning device comprises:

a binarizer configured to binarize pixel values for pixels of the image into a first pixel value or a second pixel value, wherein the first pixel value corresponds to the first subset of the pixels and a second subset of the pixels associated with a noise light source, and the second pixel value corresponds to background pixels;

a connecting unit configured to connect neighboring pixels having the first pixel value to form a plurality of connected domains associated with the plurality of stripes;

a domain analyzer configured to:

group the plurality of connected domains into domain groups corresponding to the light source;

perform a grouping sub-process comprising: calculating a distance between a center of a reference domain and a candidate domain, assigning the candidate domain to a domain group same as the domain group of the reference domain if the distance is less than a half of a sum of domain lengths of the reference domain and the candidate domain, and assigning the candidate domain to a domain group different from the domain group of the reference domain if the distance is greater than or equal to a half of the sum;

sort the connected domains according to their domain lengths;

select a first connected domain from a list as a reference domain;

assign the reference domain to either a first or second domain group; and group the connected domains in sequence, comprising: selecting a next reference adjacent domain as a candidate domain, assigning the candidate domain to either first or second group based on the reference domain, and updating the candidate domain to the next reference domain; and a center analyzer configured to determine locations of the domain groups corresponding to the light sources; and an identity determining device configured to determine locations and identities of the multiple light sources.

9. The image processing system of claim 8, wherein the positioning device further comprises:
- a binarizer configured to binarize pixel values for pixels of the image into a first pixel value or a second pixel value, wherein the first pixel value corresponds to the first and second subset of the pixels and the second pixel value correspond to background pixels;
- a connecting unit configured to connect neighboring pixels having the first pixel value to form a plurality of connected domains associated with the plurality of stripes;
- a domain analyzer configured to group the plurality of connected domains into domain groups corresponding to the light sources; and
- a center analyzer configured to determine locations of the domain groups corresponding to the light sources.

10. A method for determining locations and identities of light sources, comprising:
- capturing an image containing a set of pixels via an imaging device of an image processing apparatus, wherein the set of pixels comprises a first subset of pixels representing a plurality of stripes associated with the multiple light sources, and the light sources are configured to produce light pulses at a pulse frequency; the imaging device is configured to scan the light sources to capture the image;
- receiving and storing, via a memory of the image processing apparatus, the image and feature information regarding the light sources;
- binarizing, via a binarizer of the image processing apparatus, pixel values for pixels of the image into a first pixel value or a second pixel value, wherein the first pixel value corresponds to the first and second subset of the pixels and the second pixel value correspond to background pixels;
- connecting, via a connecting unit of the image processing apparatus, neighboring pixels having the first pixel value to form a plurality of connected domains associated with the plurality of stripes;
- grouping, via a domain analyzer of the image processing apparatus, the plurality of connected domains into domain groups corresponding to the light sources;
- determining, via a center analyzer of the image processing apparatus, locations of the domain groups corresponding to the light sources; and
- determining, via an identity determining device of the image processing apparatus, locations and identities of the multiple light sources.

11. A non-transitory computer readable medium that stores a set of instructions that are executable by at least one processor of an image processing apparatus to cause the apparatus to perform a method for determining location and identities of light sources, the method comprising:
- capturing an image containing a set of pixels via an imaging device, wherein the set of pixels comprises a first subset of pixels representing a plurality of stripes associated with the light sources, and the light sources produces light pulses at a pulse frequency; the imaging device is configured to scan the light sources to capture the image;
- receiving and storing the image captured by the imaging device and feature information regarding the light sources via a memory;
- binarizing pixel values for pixels of the image into a first pixel value or a second pixel value via a binarizer, wherein the first pixel value corresponds to the first and second subset of the pixels and the second pixel value correspond to background pixels;
- connecting neighboring pixels having the first pixel value to form a plurality of connected domains associated with the plurality of stripes via a connecting unit;
- grouping the plurality of connected domains into domain groups corresponding to the light sources, via a domain analyzer;
- determining locations of the domain groups corresponding to the light sources via a center analyzer; and
- determining location and identities of the light sources via an identity determining device.

* * * * *